United States Patent
Bensmann

(10) Patent No.: US 11,230,365 B2
(45) Date of Patent: Jan. 25, 2022

(54) LEADING-EDGE COMPONENT FOR AN AIRCRAFT

(71) Applicant: Airbus Operations GmbH, Hamburg (DE)

(72) Inventor: Stefan Bensmann, Hamburg (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 16/852,862

(22) Filed: Apr. 20, 2020

(65) Prior Publication Data

US 2021/0197954 A1    Jul. 1, 2021

(30) Foreign Application Priority Data

Apr. 29, 2019 (DE) .......................... 10 2019 110 946

(51) Int. Cl.
*B64C 9/26* (2006.01)

(52) U.S. Cl.
CPC ...................... *B64C 9/26* (2013.01)

(58) Field of Classification Search
CPC ........................................................ B64C 9/26
See application file for complete search history.

(56) References Cited

U.S. PATENT DOCUMENTS

| | | | | |
|---|---|---|---|---|
| 5,362,347 A * | 11/1994 | Domine | ................... | B29C 66/72 156/212 |
| 2008/0237401 A1 * | 10/2008 | Overbergh | ................ | B64C 9/22 244/214 |
| 2009/0127392 A1 * | 5/2009 | Gross | ........................ | B32B 3/30 244/121 |
| 2015/0114548 A1 * | 4/2015 | Rodman | ................. | B29C 70/70 156/196 |

FOREIGN PATENT DOCUMENTS

| | | |
|---|---|---|
| DE | 69200705 T2 | 3/1995 |
| DE | 102005060958 A1 | 6/2007 |
| EP | 1371551 A1 | 12/2003 |
| EP | 2130762 A2 | 12/2009 |
| EP | 3318481 A1 | 5/2018 |

OTHER PUBLICATIONS

Extended European Search Report including Written Opinion for Application No. EP20171559.6, dated Sep. 28, 2020, pp. 1-12.
German Search Report for Application No. 102019110946.9, dated Jan. 13, 2020, pp. 1-6 (p. 2 categorizing cited references).

* cited by examiner

*Primary Examiner* — Justin M Benedik
(74) *Attorney, Agent, or Firm* — Lerner, David, Littenberg, Krumholz & Mentlik, LLP

(57) ABSTRACT

A leading-edge component for an aircraft includes at least a part of a flow body having a front skin and at least one rib, wherein the front skin includes a top section, a bottom section and a leading edge arranged therebetween, wherein the rib extends from the bottom section to the top section, wherein the rib includes at least one kink separating the rib into a first section and at least one second section, and wherein main extension planes of the first section and the at least one second section enclose an angle of at least 10°.

12 Claims, 3 Drawing Sheets

LEADING-EDGE COMPONENT FOR AN AIRCRAFT

FIELD OF THE INVENTION

The invention relates to a wing leading-edge component, a wing having a fixed wing body and a wing leading-edge component, as well as an aircraft.

BACKGROUND OF THE INVENTION

Aerodynamic components of an aircraft are designed to meet several aerodynamic requirements of the respective aircraft, which lead to a certain shape exposed to an airflow. For optimizing the weight of the aircraft, usually hollow structures are used, which are stiffened by an interior structure. For example, a leading edge of a flow body used in a commercial aircraft may comprise a skin and ribs attached to an interior side of the skin.

Besides the aerodynamic and weight requirements, also bird strike is a sizing scenario for leading-edge regions of a flow body of an aircraft. For example, it is known to provide a reinforcing panel structure on the leading-edge region to withstand impact to a great extent. A rupture of an outer skin of a flow body in the leading-edge region due to an impact should be avoided. For example, EP 3 318 481 A1 shows a panel structure for an aircraft having an improved impact resistance.

BRIEF SUMMARY OF THE INVENTION

Aspects of the invention may provide an alternate leading-edge component, which has improved impact characteristics for avoiding ruptures of a skin panel that is stiffened by an interior structure.

A leading-edge component for an aircraft is proposed, comprising at least a part of a flow body having a front skin and at least one rib, wherein the front skin comprises a top section, a bottom section and a leading edge arranged therebetween, wherein the rib extends from the bottom section to the top section, wherein the rib comprises at least one kink separating the rib into a first section and at least one second section, and wherein main extension planes of the first section and the at least one second section enclose an angle of at least 10°.

The leading-edge component can be any component that is capable of being arranged at a leading edge of an aircraft. For example, it may be a fixed leading-edge component as a part of a wing, of a horizontal tail plane or of a vertical tail plane. However, it may also be a movable component, such as a leading-edge slat or similar, which is designed to move relative to a fixed part of the aircraft.

In the context of the invention, the flow body may be considered an aerodynamic body that has a leading edge, which is exposable to an air flow and which is designed according to the invention. Hence, the leading-edge component may comprise a part of the flow body, such as a part of a fixed leading edge of a wing, or it comprises the whole flow body, such as a movable surface exposed to an airflow.

The front skin may be based on a surface-like component that comprises a significant curvature about a spanwise axis to form an aerodynamically advantageous leading-edge region. For example, the front skin is curved about significantly more than 45°, for example at least 90°. In the course of this curvature, a leading edge separates a bottom section and a top section. The leading edge is a line that may be close to a stagnation point in a certain flight state, such as the cruise flight.

A rib is a stiffening component, which is usually arranged parallel to a chordwise axis of the leading-edge component, which may be parallel to the x-axis, i.e. the longitudinal axis of the aircraft or perpendicular to the sweep angle of the flow body. Objects that hit the leading edge of an aircraft may cause a deformation of the material at the leading edge. By providing a rib with the design proposed according to the invention, the leading-edge component is more flexible and the front skin is allowed to distinctly deform. Hence, ruptures in the front skin directly adjacent to flanges of the rib or ruptures through a series of connection holes for rivets between the front skin and the flanges can be avoided to a large extent.

The first section as well as the at least one second section are designed as substantially flat components, which may comprise a surface-like part, which is at least partially surrounded by a radial outer flange that is attachable to the front skin. The surface-like part is not necessarily a completely solid planar part. It may also be realized as a framework with distinct recesses or cutouts. The surface-like part spans up the respective main extension plane.

By providing at least one kink in the rib, a first section and one or several second sections are created. The kink may be designed to provide an angle between two directly adjacent sections to be at least 10°. The kink may extend perpendicular or at least transverse to a chord axis of the respective flow body. It may particularly be substantially parallel to a vertical axis of the aircraft or the flow body in a predetermined installation position, respectively. By providing the kink, the stiffness of the leading-edge component at least along an expected impact direction is slightly weakened. Consequently, the front skin clearly deforms and thus absorbs the kinetic energy of the impacting object, before the front skin ruptures. The rib supports the deformation by performing an evasive movement.

In an advantageous embodiment, the main extension plane of the first section is not perpendicular to the leading edge. Hence, the leading edge does not constitute the surface normal of the main extension plane. With an impact onto the leading edge, a bending moment acts onto the kink between the first section and the at least one second section, thereby leading to a larger deformation area in the front skin, as the rib follows the deformation.

In another advantageous embodiment, a surface normal of the main extension plane of the first section and the leading edge enclose an angle of at least 10°. By including such an angle between these two lines, a distinct bending moment is created, which allows a kink region to deform to follow the front skin deformation. Hence, by allowing the kink region to fold the first section relative to the directly adjacent second section, the front skin may significantly bulge into an interior space of the flow body.

Still further, the main extension plane of the at least one second section may be perpendicular to the leading edge. Hence, only a region in the first section needs to be designed differently than in common stiffening arrangements.

It is advantageous, if the main extension plane of the at least one second section is parallel to a chord axis of the flow body. This may be comparable to a usual design of a stiffening rib in a movable flow body arranged on an aircraft. However, this also means that the main extension plane of the first section clearly differs from a parallel plane to a chord axis of the flow body.

In another advantageous embodiment, the kink between the first section and a directly adjacent second section is designed for at least folding or breaking the first section relative to the second section on an impact of a moving object onto the leading edge. Thus, the kink may be considered a weakened region that clearly allows to let both sections fold to each other during an impact. The kink should therefore be designed in such a manner, that a folding motion is not hindered. It should thus not be stiffened or otherwise modified to maintain its shape. However, it may also be possible to design the kink to act as a predetermined breaking region. A break at the kink between the first section and the directly adjacent second section would also result in the improved absorption of impact energy and improved deformation.

In some cases, it is advantageous if the component is designed to be a fixed component rigidly attachable to a structure. Such a component may for example be a fixed leading edge of a wing, a fixed leading edge of a horizontal tail plane or a fixed leading edge of a vertical tail plane. However, many other types of components are conceivable.

Also, in some cases, the component may be designed to be a movable component and having a substantially closed surface. For example, the movable component may be a leading-edge flap of a wing and thus a part of a high lift system. The component may be realized in the form of a droop nose, a slat or any other conceivable element.

The invention further relates to a wing for an aircraft, having a leading-edge component according to the above description. The wing may comprise a distinct sweep angle, in particular if the aircraft is a commercial passenger aircraft. It is conceivable that the angle between the first section and the at least one second section is measured along the sweep angle. For example, if the wing is positively swept, the first section is angled further backwards and outwards. However, it may also be conceivable that the angle between the first section and the at least one second section is measured opposite to the sweep angle. Hence, in this case with a positively swept wing, the first section may be angled further forward and inwards. Preferably, the leading-edge components to be arranged on both wings of a commercial aircraft are designed in a mirror-inverted, symmetrical manner.

In an advantageous embodiment, the wing further comprises a fixed leading edge, wherein the leading-edge component is movable between a retracted position directly forward the fixed leading-edge and at least one extended position at a further distance to the fixed leading edge. As explained above, the leading-edge component may be a leading-edge flap, which is movable relative to a fixed leading edge of the wing. It may be a droop nose or a leading edge slat, which is capable of providing a translational and rotational motion.

The invention still further relates to an aircraft having at least one wing according to the above description or at least one leading-edge component according to the above description. The aircraft may preferably be a commercial aircraft, a transport aircraft or a military aircraft. It may comprise at least one turbofan or turboprop engine, leading to significant cruise speed and thus to higher expected impact speeds of foreign objects.

It is advantageous if the first section and the at least one second section are parallel to a vertical axis of the aircraft. The vertical axis, which is also known as z-axis, is the vertical component of an aircraft-fixed coordinate system.

If the first section is parallel to an x-z-plane of the aircraft, the fastening means are arranged on a single line in the x-z-plane. This leads to a reduced drag in comparison with a wider, i.e. more spanwise, distribution of the fastening means.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
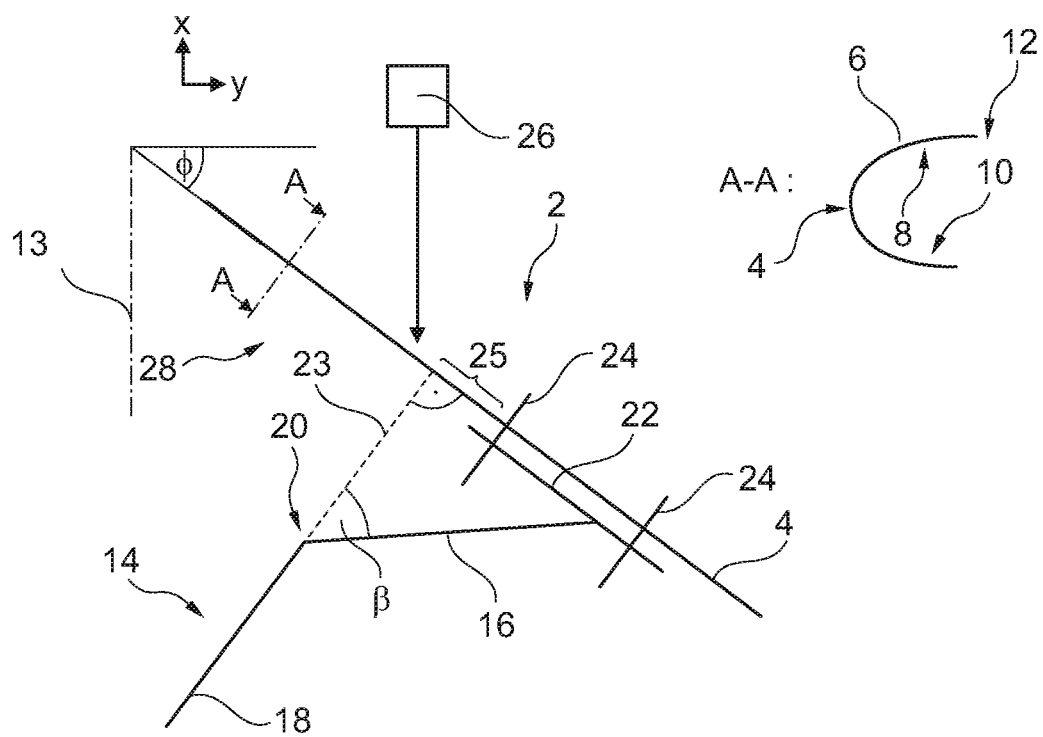
FIG. 1 shows a first exemplary embodiment of a leading-edge component for an aircraft in a schematic illustration.

FIG. 1 shows a schematic illustration of a leading-edge component 2. Here, a leading edge 4 is shown, arranged at a distinct sweep angle φ relative to a horizontal axis Y of the component 2 is shown. Here, the component 2 comprises a front skin 6 having a top section 8, a bottom section 10 and the leading edge 4 arranged therebetween. The front skin 6 and the leading edge 4 are a part of a flow body 12, which may be a movable component or a part of a wing or the such. The illustrated coordinate system with X- and Y-axis can be an aircraft fixed coordinate system with the X axis being a longitudinal axis, i.e. a direction of flight, the Y axis being a lateral/horizontal axis. A Z-axis is perpendicular to both X and Y axes and defines the vertical axis. The sweep angle φ is an angle enclosed by the leading edge 4 and the Y axis. It may be a sweep angle of a wing or a tail plane.

The flow body 12 may comprise a chord axis 13, which extends along the X axis. In other cases, the flow body 12 may comprise a chord axis, which is substantially perpendicular to the leading edge 4.

Inside the leading edge component 2, a rib 14 is arranged, which comprises a first section 16 and a directly adjacent second section 18, which are separated by a kink 20. Main extension planes of the first section 16 and the second section 18 enclose an angle β of at least 10°. The main extension planes may extend into the drawing plane along the visible lines of the respective sections 16 and 18. Hence, the reference numerals 16 and 18 of the simplified drawings may also refer to the respective main extension planes.

Further, exemplarily an extension plane 23 of the second section 18 is perpendicular to the leading edge 4, such that the leading edge 4 constitutes a surface normal to the extension plane of the second section 18. Such an arrangement may be common for leading-edge flaps or slats according to the state of the art. However, arranging a kink 20 and a first section 16 at the angle β to the second section 18, numerous advantages are achieved for the component 2. The rib 14 is attached to the front skin six through a flange 22 through fastening means 24, which may exemplarily be rivets or the like. The flange 22 may enclose an offset 25 to the extension plane 23 of the second section 18, that directly follows on to the first section 16.

A foreign object 26, which is shown as an illustration only and which moves along the X axis during longitudinal flight, may impact onto the leading edge 4 in flight of the aircraft. Due to the sweep angle φ of the leading edge 4, the object 26 does not impact onto the leading edge 4 perpendicularly. Thus, the impact leads to a force component perpendicular to the leading edge 4 as well as a (smaller) force component parallel to the leading edge 4. Since the rib 14 has a kink 20 from which on the first component 16 is slightly offset along the leading edge 4, the force component parallel to the leading edge 4 leads to a bending moment around the kink 20 and, consequently, a folding motion of the first section 16 to support a deformation of the front skin 6. In doing so, a maximum of kinetic energy due to the impact can be absorbed.

Figure 2:
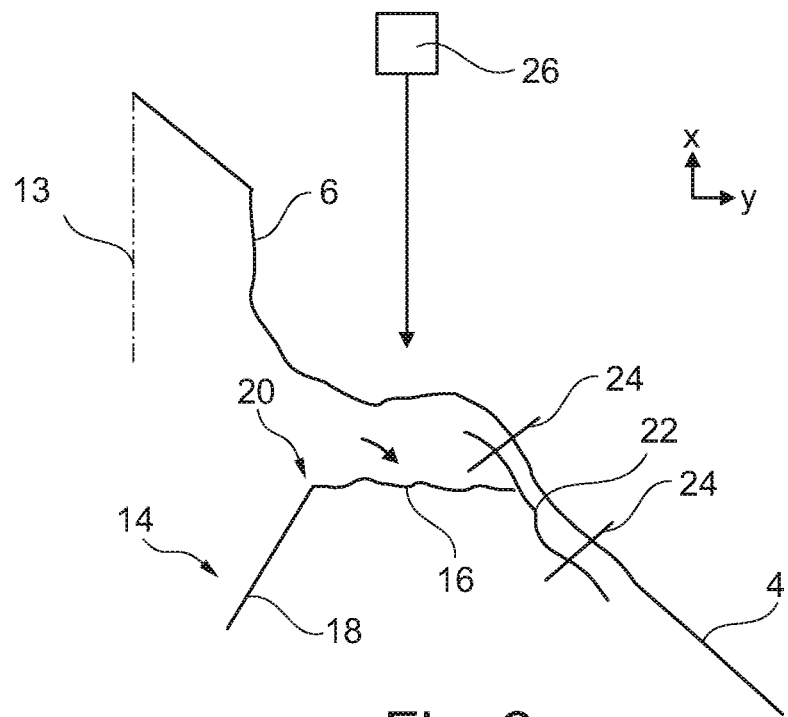
FIG. 2 shows a deformed front skin of the leading-edge component of FIG. 1.

During the deformation, which is shown in FIG. 2, the front skin 6 distinctly bulges into an interior space 28 of the component 2. By folding, the rib 14 moves out of the way to avoid a rupture of the front skin 6. Hence, the component 2 may be deformed without destroying the front skin 6.

Figure 3:
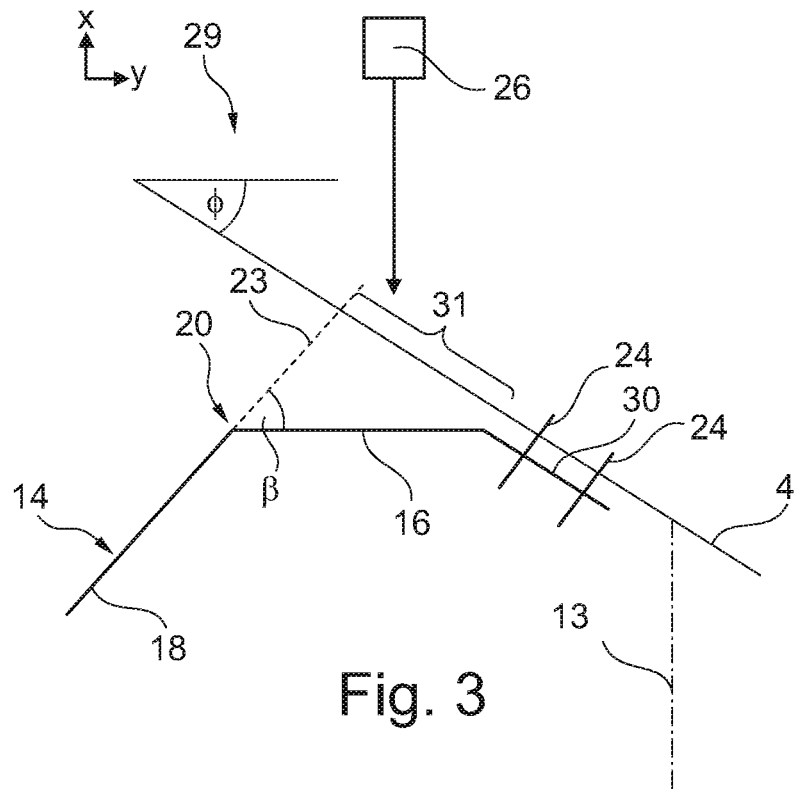
FIG. 3 shows a second exemplary embodiment of a leading-edge component for an aircraft in a schematic illustration.
Figure 4:
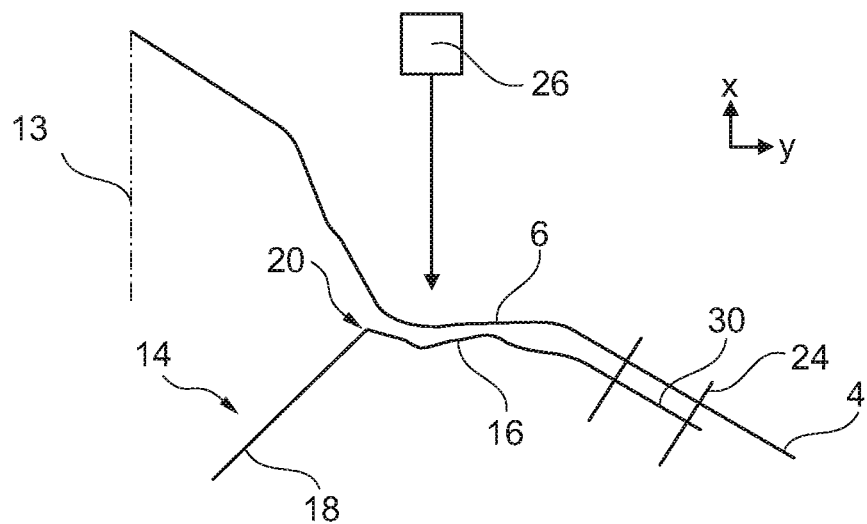
FIGS. 4 and 5 both show a deformed front skin of the leading-edge component of FIG. 3 with two different impact positions.
Figure 5:
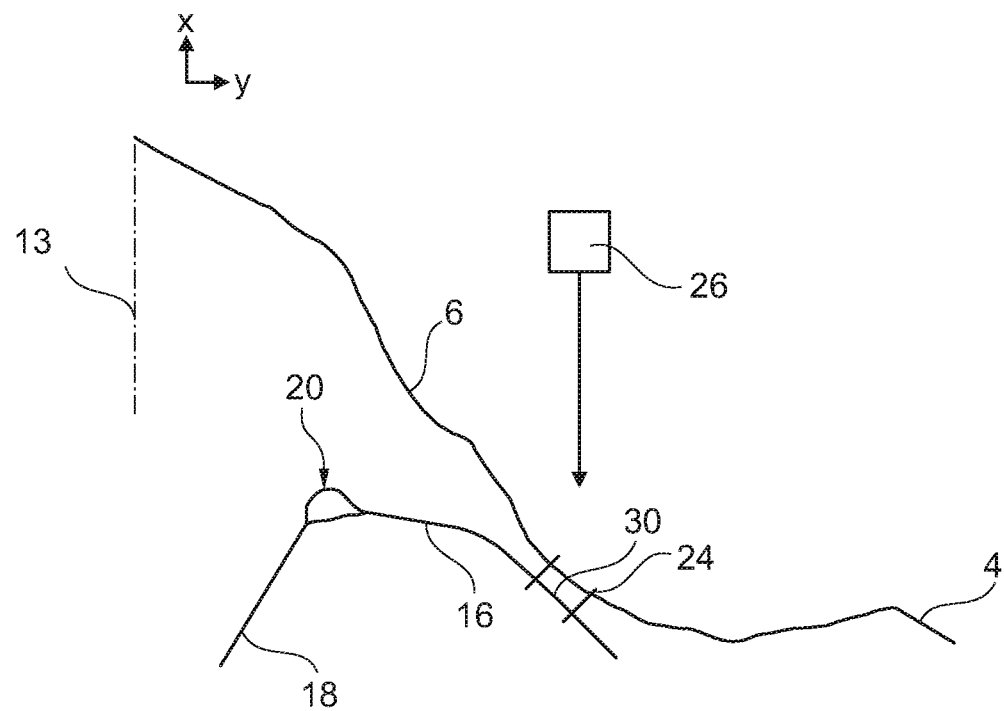

In FIG. 3 a slightly modified leading-edge component 29 is shown. Here, a flange 30 is arranged at an interior side of the front skin 6, which extends to one side of the first section 16 only. The flange 30 thus comprises a larger offset 31 in comparison to the previous exemplary embodiment. Here, the deformability is even further improved, as the flange 30 hardly counteracts a folding motion of the first section 16. This can be seen in FIG. 4, where the front skin 6 reaches a surface of the first section 16 after an impact of the foreign object 26 at a clear distance to the flange 30.

If such an impact occurs nearer at the flange 30, the flange 30 may provide an avoiding motion in a more spanwise direction. The first section 16 and the second section 18 are folded relative to each other and in the shown example, the flange 30 and the first section 16 almost constitute a straight line. Thus, even when a region directly on the flange 30 is hit by the foreign object 26, a rupture of the front skin 6 may be prevented or at least delayed. Due to the design of the rib 14, more impact energy may be absorbed by deforming front skin 6 and folding the rib 14 in comparison with common rib designs.

Figure 6:
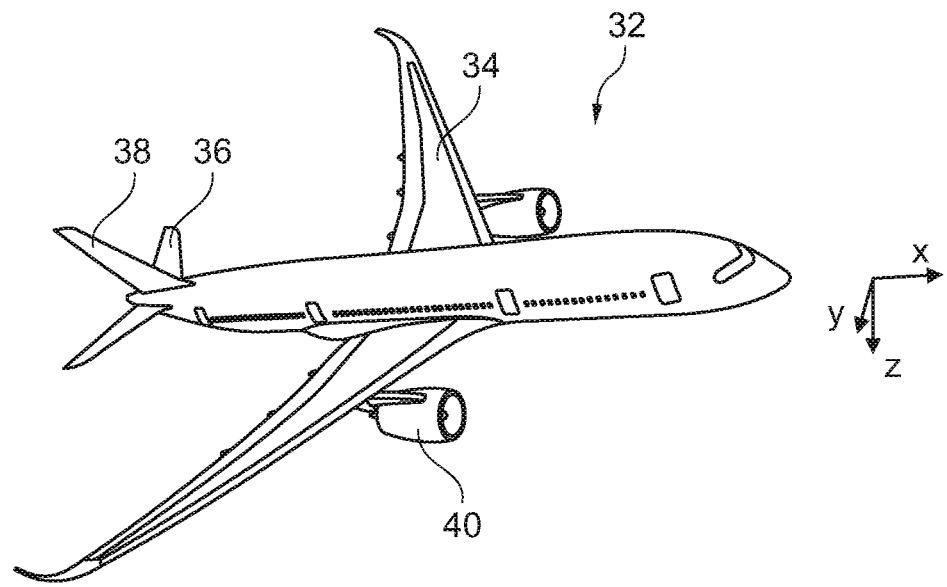
FIG. 6 shows an aircraft having at least one leading-edge component.

FIG. 6 shows an aircraft 32 having wings 34, a horizontal tail plane 36, a vertical tail plane 38 and engines 40. Each of these elements may comprise a leading-edge component 2 or 29 according to the previous illustrations. Here, the coordinate system of the previous figures is shown. The x-axis is a longitudinal axis parallel to a longitudinal extension of the aircraft 32. A vertical axis z is additionally shown. As mentioned previously, the first section 16 and the at least one second section 18 are parallel to the vertical axis z of the aircraft 32.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 leading-edge component
4 leading edge
6 front skin
8 top section
10 bottom section
12 flow body
13 chord axis
14 rib
16 first section
18 second section
20 kink
22 flange
23 extension plane
24 fastening means
25 offset
26 moving/foreign object
28 interior space
29 leading-edge component
30 flange
31 offset
32 aircraft
34 wing
36 horizontal tail plane
38 vertical tail plane
40 engine
φ sweep angle
β angle between first and second section

The invention claimed is:

1. A leading-edge component for an aircraft, comprising:
at least a part of a flow body having a front skin, at least one rib, and a flange,
wherein the front skin comprises a top section, a bottom section and a leading edge arranged therebetween,
wherein the rib extends from the bottom section to the top section,
wherein the rib comprises at least one kink separating the rib into a first section and at least one second section,
wherein main extension planes of the first section and the at least one second section enclose an angle of at least 10°, and
wherein the at least one rib is attached to the flange such that the flange encloses an offset to the main extension plane of the at least one second section.

2. The leading-edge component according to claim 1, wherein the main extension plane of the first section is not perpendicular to the leading edge.

3. The leading-edge component according to claim 2, wherein a surface normal of the main extension plane of the first section and the leading edge enclose an angle of at least 10°.

4. The leading-edge component according to claim 1, wherein the main extension plane of the at least one second section is perpendicular to the leading edge.

5. The leading-edge component according to claim 1, wherein the main extension plane of the at least one second section is parallel to a chord axis of the flow body.

6. The leading-edge component according to claim 1, wherein the kink between the first section and a directly adjacent second section is configured for at least folding or breaking the first section relative to the second section on an impact of a moving object onto the leading edge.

7. The leading-edge component according to claim 1, wherein the leading-edge component is configured to be a fixed component rigidly attachable to a structure.

8. The leading-edge component according to claim 1, wherein the leading-edge component is configured to be a movable component having a substantially closed surface.

9. A wing for an aircraft, having a leading-edge component according to claim 1.

10. The wing according to claim 9, further comprising a fixed leading edge, wherein the leading-edge component is movable between a retracted position directly forward the fixed leading-edge and at least one extended position at a further distance to the fixed leading edge.

11. An aircraft having at least one wing of claim 9 or at least one leading-edge component comprising:
at least a part of a flow body having a front skin and at least one rib,
wherein the front skin comprises a top section, a bottom section and a leading edge arranged therebetween,
wherein the rib extends from the bottom section to the top section,
wherein the rib comprises at least one kink separating the rib into a first section and at least one second section, and
wherein main extension planes of the first section and the at least one second section enclose an angle of at least 10°.

12. The aircraft of claim 11, wherein the first section and the at least one second section are parallel to a vertical axis of the aircraft.

* * * * *